United States Patent
O'Brien et al.

(10) Patent No.: US 6,654,782 B1
(45) Date of Patent: Nov. 25, 2003

(54) MODULAR FRAMEWORK FOR DYNAMICALLY PROCESSING NETWORK EVENTS USING ACTION SETS IN A DISTRIBUTED COMPUTING ENVIRONMENT

(75) Inventors: Eric David O'Brien, Leesburg, VA (US); James Robert Tryon, Jr., Fremont, CA (US)

(73) Assignee: Networks Associates, Inc., Santa Clara, CA (US)

( * ) Notice: Subject to any disclaimer, the term of this patent is extended or adjusted under 35 U.S.C. 154(b) by 0 days.

(21) Appl. No.: 09/467,730

(22) Filed: Dec. 20, 1999

Related U.S. Application Data

(60) Provisional application No. 60/161,968, filed on Oct. 28, 1999.

(51) Int. Cl.$^7$ .............................. G06F 15/16; G06F 9/00; G06F 15/173; G06F 9/44
(52) U.S. Cl. ...................... 709/201; 709/202; 709/224; 709/104; 709/315
(58) Field of Search ................................. 709/202, 201, 709/224, 104, 315; 700/48; 370/254

(56) References Cited

U.S. PATENT DOCUMENTS

| | | | | |
|---|---|---|---|---|
| 5,958,009 A | * | 9/1999 | Friedrich et al. | 709/104 |
| 6,108,700 A | * | 8/2000 | Maccabee et al. | 709/224 |
| 6,327,550 B1 | * | 12/2001 | Vinberg et al. | 700/48 |
| 6,363,421 B2 | * | 3/2002 | Barker et al. | 709/202 |
| 6,393,386 B1 | * | 5/2002 | Zager et al. | 703/25 |
| 6,425,017 B1 | * | 7/2002 | Dievendorff et al. | 709/315 |

OTHER PUBLICATIONS

Gill et al., Distributed Object Visualization For Sensor–Driven Systems, Mar. 1999, IEEE, pp. 2.B.1–1–2.B.1–7.*

Snyder et al., Multi–threaded Message and Event Routing for the DO Online System, Jun. 1999, Real Time Conference, 11$^{th}$ IEEE, pp. 492–495.*

Gossink et al., Communication Architecture to Support Distributed Sensors, Jul. 1998, IEEE, pp. 588–592.*

"Patrol 3.3—Advanced Enterprise Management and Control—Data Sheet," BMC Software, http://www.bmc.com/rs–bin/RightSite/getcontent/bmcdoc.html?dmw_object=090032018011c73e&dmw_format=html, 2000.

"HP OpenView Extensible SNMP Agent—Product Brief," Hewlett Packard, Jun. 1996.

* cited by examiner

*Primary Examiner*—Joseph H. Feild
*Assistant Examiner*—Chau Nguyen
(74) *Attorney, Agent, or Firm*—Patrick J. S. Inouye; Christopher J. Hamat

(57) ABSTRACT

A system and method for dynamically processing a network event using an action set in a distributed computing environment are described. The occurrence of a network event is sensed via a sensor thread through receipt of a message indicating a network event occurrence, the message including event data pertinent to the network event. A generate daemon via a generate thread is launched responsive to a notification from the sensor process. An event mapping is retrieved by the generate daemon. The event mapping corresponds to the network event and identifies an action set. A generated action set is generated from the event mapping by the generate daemon and the generated action set is enqueued onto an event queue within which can be queued a plurality of generated action sets which each correspond to an instance of an action set. A process daemon is launched via a process thread responsive to a notification from the generate daemon. The generated action set is retrieved from the event queue by the process daemon and the generated action set is processed by causing the execution of at least one action embedded therein.

33 Claims, 9 Drawing Sheets

MODULAR FRAMEWORK FOR DYNAMICALLY PROCESSING NETWORK EVENTS USING ACTION SETS IN A DISTRIBUTED COMPUTING ENVIRONMENT

CROSS-REFERENCE TO RELATED APPLICATION

This patent application claims priority under 35 U.S.C. §119(e) to provisional patent application Serial No. 60/161,968, filed Oct. 28, 1999, the disclosure of which is incorporated herein by reference.

FIELD OF THE INVENTION

The present invention relates in general to network event management and, in particular, to a modular framework for dynamically processing network events using action sets in a distributed computing environment.

BACKGROUND OF THE INVENTION

Information networks interconnecting a wide range of computational resources have become a mainstay of corporate enterprise computing environments. Typically, several host computer systems are interconnected internally over an intranetwork to which individual workstations and network resources are connected. These intranetworks, also known as local area networks (LANs), make legacy databases and information resources widely available for access and utilization throughout the corporation. These same corporate resources can also be interconnected to wide area networks (WANs), including public information internetworks such as the Internet, to enable internal users access to remote computational resources, such as the World Wide Web, and to allow outside users access to select corporate resources for the purpose of completing limited transactions or data transfer.

Structurally, these corporate networks generally are made up of a set of localized, often heterogeneous, subnetworks interconnected through a series of routers, hubs, bridges, gateways, and similar devices. Managing these subnetworks and the network as a whole has become increasingly complex and difficult as the size and topology of networks have grown. The Simple Network Management Protocol (SNMP), described generally in W. Stallings, "SNMP, SNMPv2, SNMPv3, and RMON 1 and 2," Chs. 1–4, Addison Wesley Longman (1999), the disclosure of which is incorporated herein by reference, defines a standardized framework of managers and agents for managing TCP/IP-based networks. Under the SNMP scheme, each manager is responsible for managing all or part of the network on behalf of network management applications and users. In turn, each agent, also known as sensor or listener, is responsible for collecting and maintaining local management information and delivering that information to one of the managers through messages in the form of SNMP traps or in response to a polling request by the manager.

A wide range of SNMP-compatible, manager/agent point products are presently available to meet various network management and security needs, such as applications for monitoring network performance and availability and proactively detecting network security vulnerabilities. One such application is the Sniffer Total Network Visibility (TNV) product, licensed by Network Associates, Inc., Santa Clara, Calif. By way of example, the Sniffer TNV product identifies network performance and security concerns through remote agents. A central manager analyzes the information collected by the remote agents and can generate a log file for use in identifying network fault and performance areas of interest. While useful for managing and troubleshooting enterprise computing environments, the Sniffer TNV manager is a dedicated application tied to a specific set of remote agents with whom the manager communicates via SNMP traps for indicating events unique to vendor specific network equipment.

Similarly, the OpenView product suite, licensed by Hewlett Packard Company, Palo Alto, Calif., provides a modular manager which responds to SNMP traps for use in legacy computing environments. The OpenView manager reports and can log the receipt of network events and includes an application programming interface (API) into which can be written plug-in actor applications. Likewise, the PATROL product, licensed by BMC Software, Houston, Tex., provides a management infrastructure for providing proactive monitoring and management of enterprise-wide computational resources through one or more SNMP managers. PATROL Knowledge Modules containing application-specific intelligence can be deployed to servers for reporting parameters and management options back to manager consoles.

The foregoing SNMP-based products represent specialized vertical products focused on resolving a particularized problem through vendor specific means. None provide a generic interface capable on interconnecting remote agents to actors via a centralized management framework. More specifically, there is no ability to flexibly and cooperatively integrate other manager/agent point products or response mechanisms into a single manager. For instance, each of the products can generate a log file specific to their respective interface, yet the log files are in non-uniform, proprietary formats which require analysis and management separate from other point products. Moreover, these products also lack a general purpose manager capable of integrating heterogeneous remote agents into a uniform framework for standardized processing of standard and proprietary SNMP events, such as node failures or active security concerns. Similarly, there is no general purpose manager for flexibly mapping actors capable of performing actions on behalf of network management applications and users in response to the receipt of disparate network events, such as automatic help desk ticket generation or electronic message notification.

Therefore, there is a need for an approach providing a modular framework within a centralized manager for flexibly interfacing network event generating agents or sensors to user-specified, executable actors or action sets. Such an approach would preferably include a capability to process standard and proprietary SNMP network events, provide a filtering function between the receipt of such events and the processing of such action sets, and allow for variable output notifications and actions.

SUMMARY OF THE INVENTION

The present invention provides modular framework for dynamically processing network events using action sets in a distributed computing environment.

An embodiment of the present invention is a system and method for dynamically processing a network event using an action set in a distributed computing environment. The occurrence of a network event is sensed via a sensor thread through receipt of a message indicating a network event occurrence, the message including event data pertinent to the network event. A generate daemon via a generate thread is launched responsive to a notification from the sensor process. An event mapping is retrieved by the generate daemon. The event mapping corresponds to the network event and identifies an action set. A generated action set is generated from the event mapping by the generate daemon and the generated action set is enqueued onto an event queue within which can be queued a plurality of generated action sets which each correspond to an instance of an action set. A process daemon is launched via a process thread responsive to a notification from the generate daemon. The generated action set is retrieved from the event queue by the process daemon and the generated action set is processed by causing the execution of at least one action embedded therein. Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Figure 1:
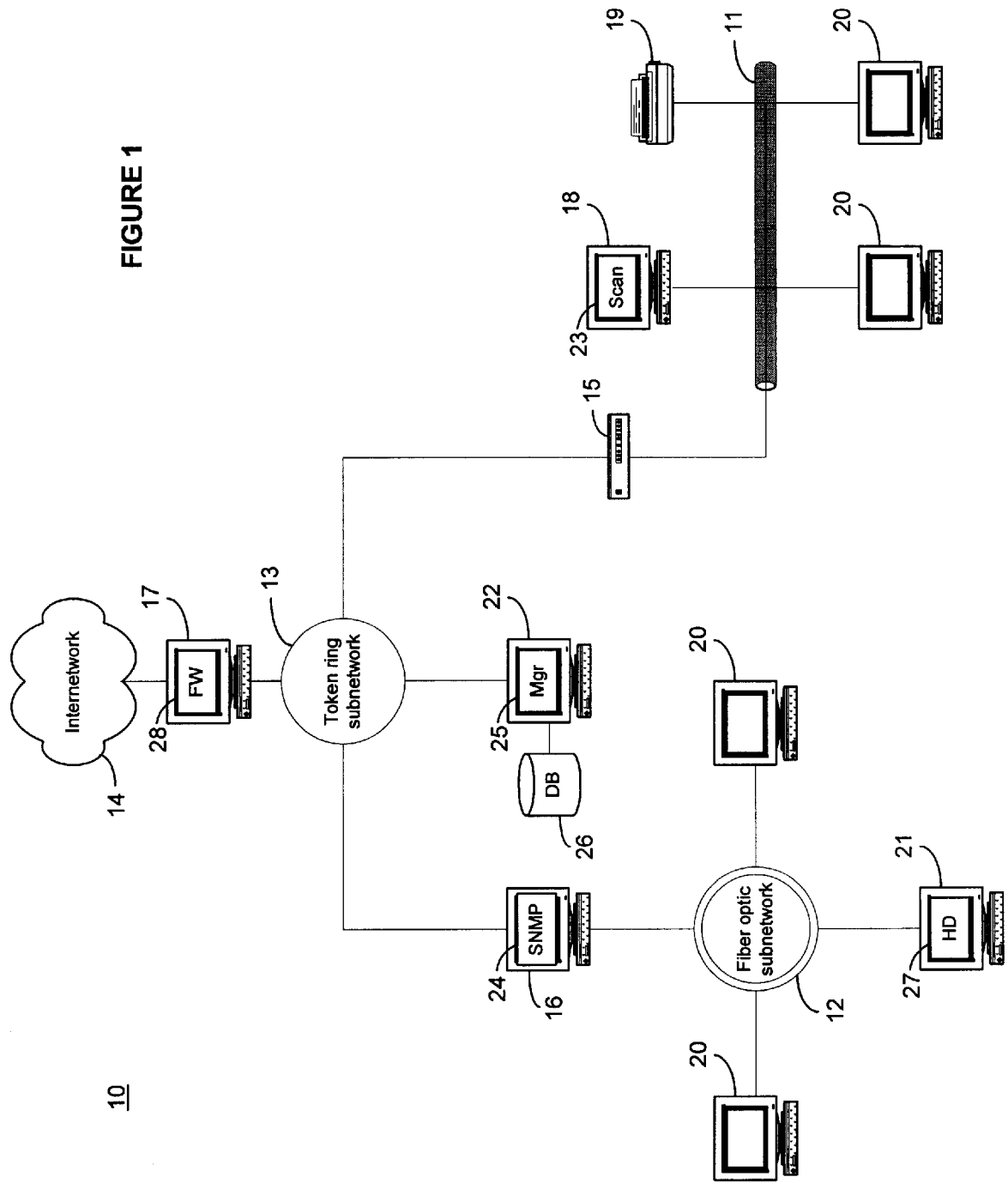
FIG. 1 is a functional block diagram showing a system for dynamically processing network events using action sets in a distributed computing environment in accordance with the present invention.

FIG. 1 is a functional block diagram showing a system 10 for dynamically processing network events using action sets in a distributed computing environment in accordance with the present invention. By way of example, a plurality of subnetworks, including an Ethernet subnetwork 11, a fiber optic subnetwork 12, and a token ring subnetwork 13, are interconnected using a bridge 15 and a router (operating on workstation 16). The token ring subnetwork 13 is interconnected to an internetwork 14, such as the Internet, using a gateway (operating on workstation 17). In addition to the foregoing network-related components, each subnetwork includes individual computational resources. For instance, the Ethernet subnetwork 11 includes a workstation 18 configured as an active security scanner (Scan) 23, a printer 19, and a pair of workstations 20. The fiber optic subnetwork includes a set of workstations 20, a workstation 21 configured as a help desk 27, and the workstation 16 further configured as a Simple Network Management Protocol (SNMP)-capable agent 24. Finally, the token ring subnetwork includes a workstation 22 configured as a network manager (Mgr) 25 with a dedicated database (DB) 26 on a secondary storage device and the workstation 17 further configured as a firewall (FW) 28. An example of a firewall 49 suitable for use in the present invention is the Gauntlet Firewall product, also licensed by Network Associates, Inc. Other network topologies and configurations of computational resources are feasible.

The individual computer systems are general purpose, programmed digital computing devices consisting of a central processing unit (CPU), random access memory (RAM), non-volatile secondary storage, such as a hard drive or CD ROM drive, network interfaces, and peripheral devices, including user interfacing means, such as a keyboard and display. Program code, including software programs, and data are loaded into the RAM for execution and processing by the CPU and results are generated for display, output, transmittal, or storage. In the described embodiment, the subnetworks 11, 12, 13 and internetwork 14 implement a Transmission Control Protocol/Internet Protocol (TCP/IP) network stack protocol implementation.

Figure 2:
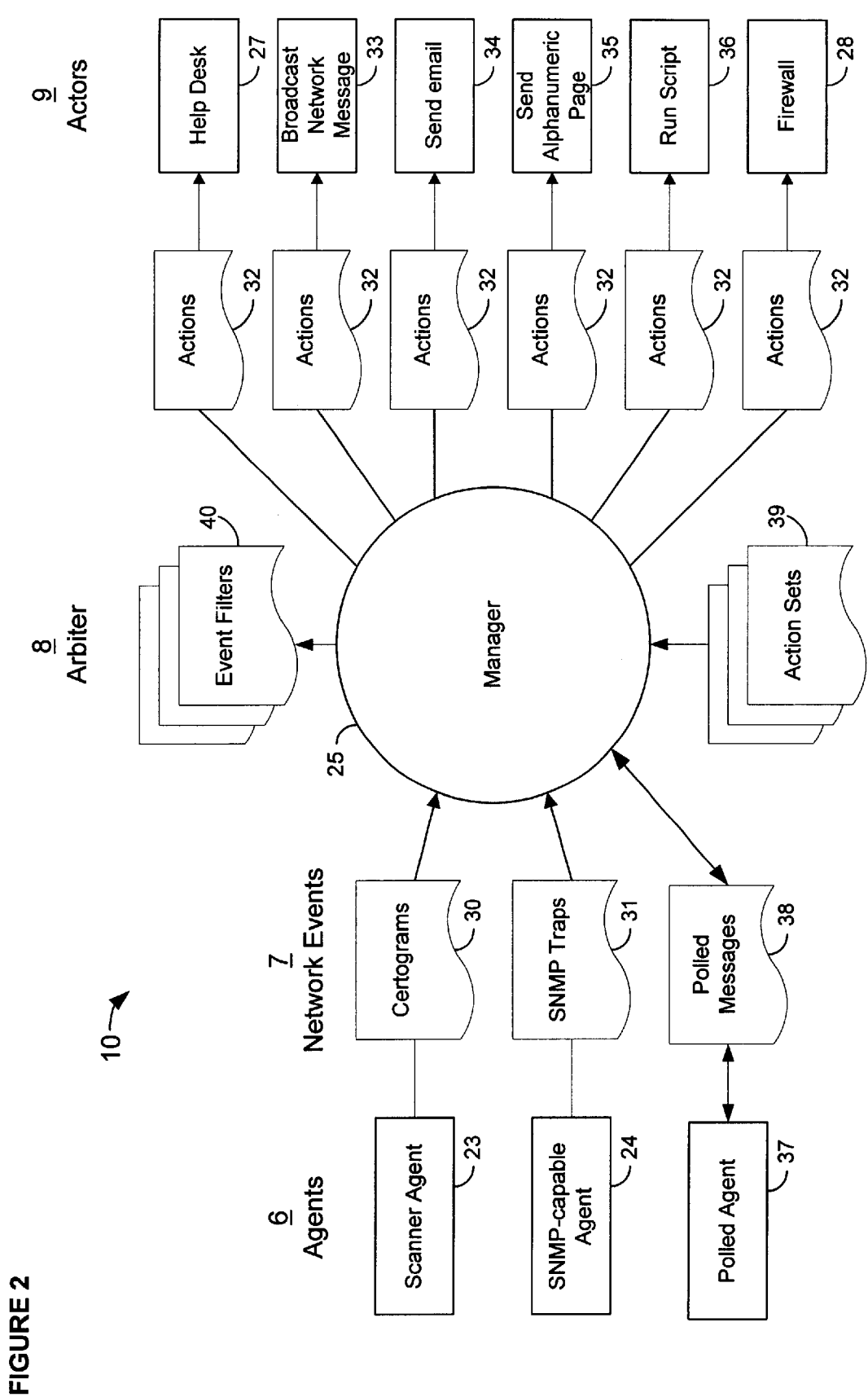
FIG. 2 is a process diagram showing the flow of network events and actions through the system of FIG. 1.

FIG. 2 is a process diagram showing the flow of processing through the system 10 of FIG. 1. Generally, there are three categories of components: agents 6, arbiter 8, and actors 9. The agents 6 generate network events 7 and the arbiter 8 maps the network events 7 to actions 32 which are performed by the actors 9. Network events 7 could be any type of state or condition which could be monitored and reported to the arbiter 8. Moreover, any of the agents 6 or actors 9 could be within the arbiter 8, on the same system 10 as the arbiter 8, or on another system remote from the arbiter 8.

In the described embodiment, the arbiter 8 is simply the manager 25. In addition, two types of agents, by way of example, are used, an active security scanner agent 23 and an SNMP-capable network management agent 24, although other types of agents could also be used. The scanner agent 23 sends security messages, known as "certograms" 30, notifying the arbiter 8 of the occurrence of network security and integrity concerns. The SNMP agent 24 sends SNMP traps 31 similarly notifying the arbiter 8 of the occurrence of network management concerns. The certograms 30 are sent with Transport Layer Security via TCP packets, as further described below. The SNMP traps 31 are sent in User Datagram Protocol (UDP) datagrams.

These two agents, scanner agent 23 and SNMP agent 24, actively report ("push") network events 7 to the manager 25. Alternatively, the manager 25 could poll the agents ("pull") for the occurrence of network events 7 via polling messages 34 exchanged with a polled agent 33. Other configurations of interconnections between various types of agents and the manager are possible, as is known in the art.

In response to the receipt of the network event notification, the manager 25 determines the set of actions to which the network event 7 is associated using a stored set of event mappings. Each of these action sets 39 group one or more actions 32 and one or more optional event filters 40. If appropriate, the manager 25 causes an actor 9 to perform some task by dispatching an appropriate action 32.

More specifically, the agents 6 sense the occurrence of network events 7. As an example, SNMP-capable agent 24 can generate two basic types of network events 7, generic and specific, which are properly referred to as "SNMP traps." Generic SNMP traps are commonly used and supported by all vendors. There are six generic traps: cold start, warm start, link down, link up, authorization failure, and neighbor loss. Specific SNMP traps are proprietary traps implemented by vendors to indicate the occurrence of events specific to their devices and must be defined in the Management Information Base (MIB) supplied with their hardware. An agent must have a copy of a vendor-specific MIB to interpret specific SNMP traps. In the described embodiment, two types of agents are used. The active security scanner agent 23 proactively analyzes the security and integrity of the network and reports any vulnerabilities to the manager 25 over an authenticated communications channel using specialized messages known as certograms 30. An example of a commercially available active security scanner agent 23 is included with the Cybercop Scanner product suite also licensed by Network Associates, Inc., Santa Clara, Calif. The SNMP-capable agent 24 monitors network performance and load characteristics. An example of a commercially available SNMP agent 24 is included with the Sniffer Total Network Visibility product suite also licensed by Network Associates, Inc. Both the SNMP agent 24 and active security scanner 18 can be implemented as either dedicated devices or as a part of the function provided by network resources.

The arbiter 8 manages the receipt, analysis, and processing of network events 7 based on user defined action sets 39. Each action set 39 defines mappings between actions 32 and event filters 40. Actions 32 are performed by actors 9 and are described below. Event filters 40 are actions which are performed after the receipt of a network event 7 but before any corresponding actions 32 are executed.

In the described embodiment, a network event 7 could be either a standard SNMP trap 31 or a specialized trap or notification, such as a certogram 30. In addition, three types of event filters are used, Visual Basic scripts, frequency thresholds, and adding custom values to the event or action based on SNMP values before the trap is forwarded to an action 32. Other forms of network events, actions and event filters are feasible as is known in the art.

The mapping of network events 7 to actions 32 is performed in an action set-centric fashion which ensures that any network event 7 may cause at least one corresponding action to occur. Each of the items associated with, in the case of a network event 7, or stored in, in the case of an event filter 40 or action 32, an action set 32 can have a many-to-many relationship to any other network event 7, event filter 40 or action 32 through participation in other action sets 39. A system and method for configuring action sets is disclosed in the related, commonly-assigned U.S. Patent application, entitled "Modular Framework For Configuring Action Sets For Use In Dynamically Processing Network Events In A Distributed Computing Environment," pending, filed Dec. 20, 1999, the disclosure of which is incorporated herein by reference. An example of a commercially available manager 25 is the Event Orchestrator product suite also licensed by Network Associates, Inc.

The actors 9 take actions in response to instructions from the arbiter 8. In the described embodiment, six types of actors are supported, a help desk 27, firewall 28, and methods for broadcasting a network message 33, sending an electronic mail message (email) 34, sending an alphanumeric page 35, and running a script 36. Other types of actors and actions are feasible. The methods could be performed by the same system as the manager 25 or by another remote system depending upon the definition of the action. Agents, arbiter, and actors are further described in "Event Orchestrator for Windows NT—Getting Started Guide," Rel. 1.02, Network Associates, Inc. (January 1999), the disclosure of which is incorporated herein by reference.

Figure 3:
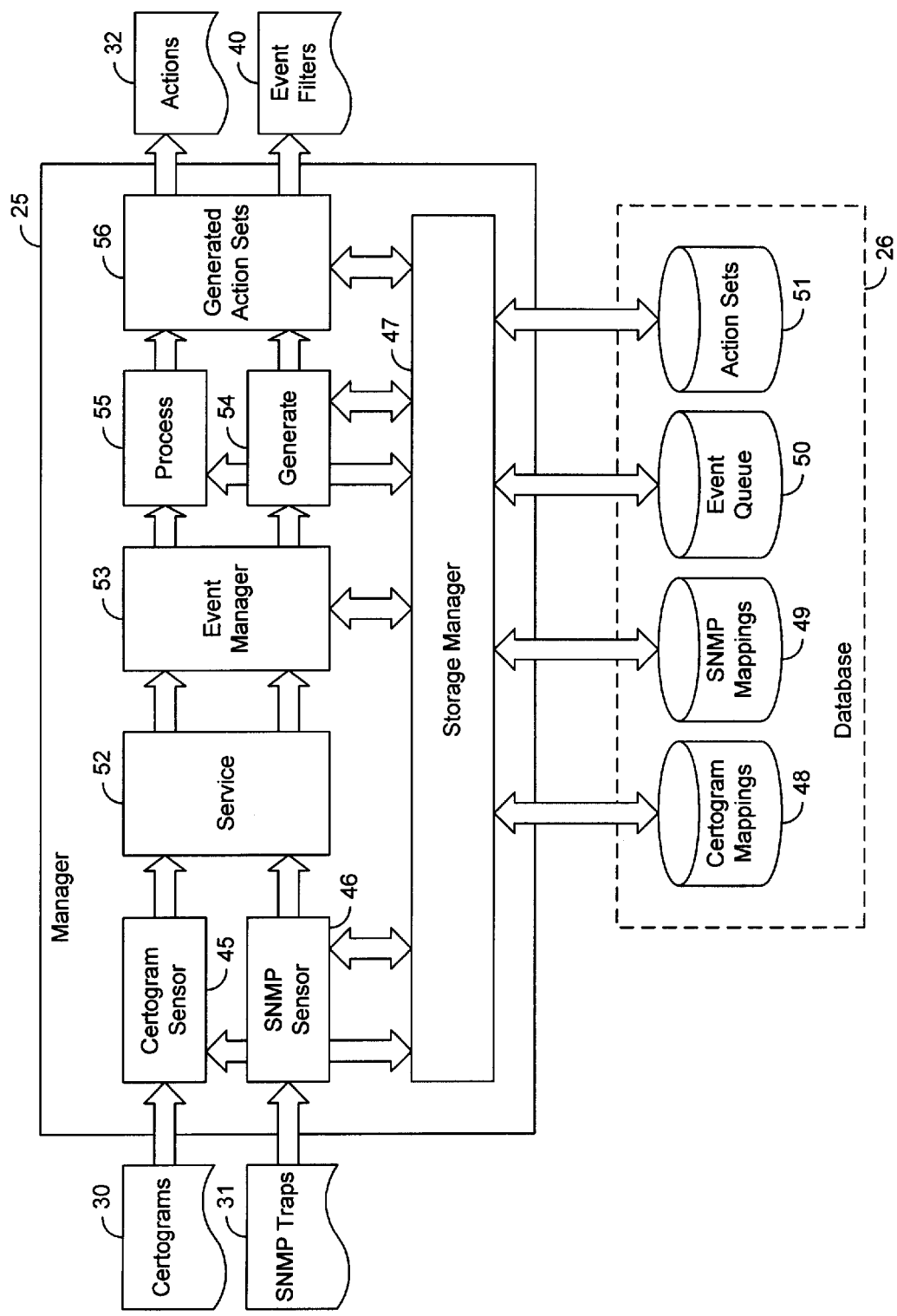
FIG. 3 is a block diagram showing the functional software modules of the manager of the system of FIG. 1.

FIG. 3 is a block diagram showing the functional software modules of the manager 25 of the system 10 of FIG. 1. Each module is a computer program written as source code in a conventional programming language, such as C++ and Visual Basic programming languages, and is presented for execution by the CPU as object or byte code, as is known in the art. The various implementations of the source code and object and byte codes can be held on a computer-readable storage medium or embodied on a transmission medium in a carrier wave. In the described embodiment, the software modules are written in accordance with the Common Object Model (COM), such as described in D. Chappell, "Understanding ActiveX and OLE," Chs. 1–5, Microsoft Press (1996), the disclosure of which is incorporated herein by reference.

The manager 25 comprises eight main modules: certogram sensor 45, SNMP sensor 46, storage manager 47, service 52, event manager 53, generate module 54, process module 55, and action sets 56. As primary inputs, the manager 25 receives notifications of the occurrence of network events 7 by means of certograms 30 and SNMP traps 31. As primary outputs, the manager 25 processes actions 32 and event filters 40. The mappings for network events 7, queued "events", that is, generated action sets, and action sets 39 are stored in the database 26. Each of these components will now be described more fully.

The certogram sensor 45 receives certograms 30 from active security agents, such as scanner agent 23, via an authenticated communications link as part of a secure Transport Layer Security connection. Active security monitors and protects the security and integrity of an unattended network through proactive analysis and by reporting to the manager 25 any suspicious or abnormal activities, such as break-in attempts or forged instructions to shut down a system. Thus, for security reasons, all communications between the system 10 and the scanner agent 23 are authenticated using digital certificates generated by a public key infrastructure (PKI) server (not shown). In the described embodiment, X.509 digital certificates are used. In particular, certograms 30 received from the scanner agent 23 can cause the manager 25 to generate action sets 25 defining the actions to ultimately be taken by the firewall 17 in response to a security alert from the scanner agent 23.

The SNMP sensor 46 receives SNMP traps from SNMP agents, such as SNMP-capable agent 24, via communications links which need not be authenticated. The SNMP standard defines an application-level protocol for remotely managing TCP/IP networks by representing individual network resources as objects. Individual SNMP messages are exchanged between agent and manager using User Datagram Protocol (UDP) datagrams. The agents can be controlled through the modification of the values of specific variables maintained in a Management Information Base (MIB) (not shown), as is known in the art. Upon the occurrence of certain network events 7, the SNMP agent 24 generates a trap which is sent via a UDP datagram to the manager 25.

The storage manager 47 is responsible for performing all accesses to the database 26 (shown in FIG. 1). All other processes, including the event manager 53 and the generate and process modules 54, 55, respectively, must coordinate database requests through the storage manager 47. Individual items stored in the database 26 are stored as storage objects which are analogous to tables in conventional databases. The database 26 consists of four principal storage objects, certogram mappings 48, SNMP mappings 49, event queue 50, and actions sets 51.

Certogram mappings 48 and SNMP mappings 49 are sets of event mappings which identify the action sets 39 associated with a particular sensor. One set of event mappings per sensor is required. Certogram mappings 48 and SNMP mappings 49 are event mappings which store the mappings of action sets 39 to network events 7, as identified by their respective sensor, certogram sensor 45 and SNMP sensor 46.

The event mappings are configured in an action set-centric manner, meaning an action set must be defined before any network event, event filter, or action can be defined. Each event mapping is referenced by a mapping key. For certograms 30, each event mapping is referenced by sensor and vulnerability. For SNMP traps 31, each event mapping is referenced by object identifier (OID), plus generic and specific identifiers. The OID identifies the particular source of the network event 7 by network address. The Generic identifier specifies whether the particular network event 7 is a known and expected event or whether the network event 7 is specific to the vendor of the agent from which the network event 7 originated. If so, the definition for the Specific identifier must be obtained from the MIB supplied with the network device. Other types of sensors may have unique mapping key formats.

The event queue 50 stores generated and processed action sets 56. Generated action sets 56 are enqueued in the event queue 50 in order of occurrence and severity. In the described embodiment, each action set is assigned a severity which indicates the general criticality of the network event 7. The action set is placed in the event queue 50 in a location higher than other action sets already in the queue but having a lesser severity. Thus, action sets 39 with the highest severity are processed before action sets 39 with lower severities, even if those lower severity action sets 39 have been enqueued for a longer period of time. The approach ensures that action sets 39 requiring the most attention, that is, having the highest severity, are processed as expeditiously as possible.

Each action set 32 is associated with a network event 7 via a mapping table, can store (embed) one or more actions 32, and can reference one or more event filters 40. Moreover, actions sets 45 can be "chained" to invoke subsequent action sets. However, to "link" an network event 7 to some action requires at least one action set 39 in the chain to be associated with at least one network event 7 and at least one action set 39 to embed at least one action 32.

The remaining modules of the manager 25 work in parallel to process network events 7 and actions 32. The service 52 provides a common service interface to sensors, such as certogram sensor 45 and SNMP sensor 46, such that additional sensors can be implemented in a plug-in manner. The event manager 53 is a top level component which functions as a component server for providing components to other objects within the manager 25. For instance, when a sensor, such as SNMP sensor 46, requires access to the corresponding mapping table, SNMP mappings 49, the SNMP sensor 46 requests the storage object for the table from the event manager 25. The generate module 54 generates an action set 39 corresponding to a network event 7 received from one of the sensors. Generated action sets 56 are placed in the event queue 50 for processing. Finally, the process module 55 executes any action objects in the event queue 50 in order of priority and order of entry. The functions performed by the manager 25, including the event manager 53, generate module 54 and process module 55, are further described below in more detail beginning with reference to FIG. 5.

Figure 4:
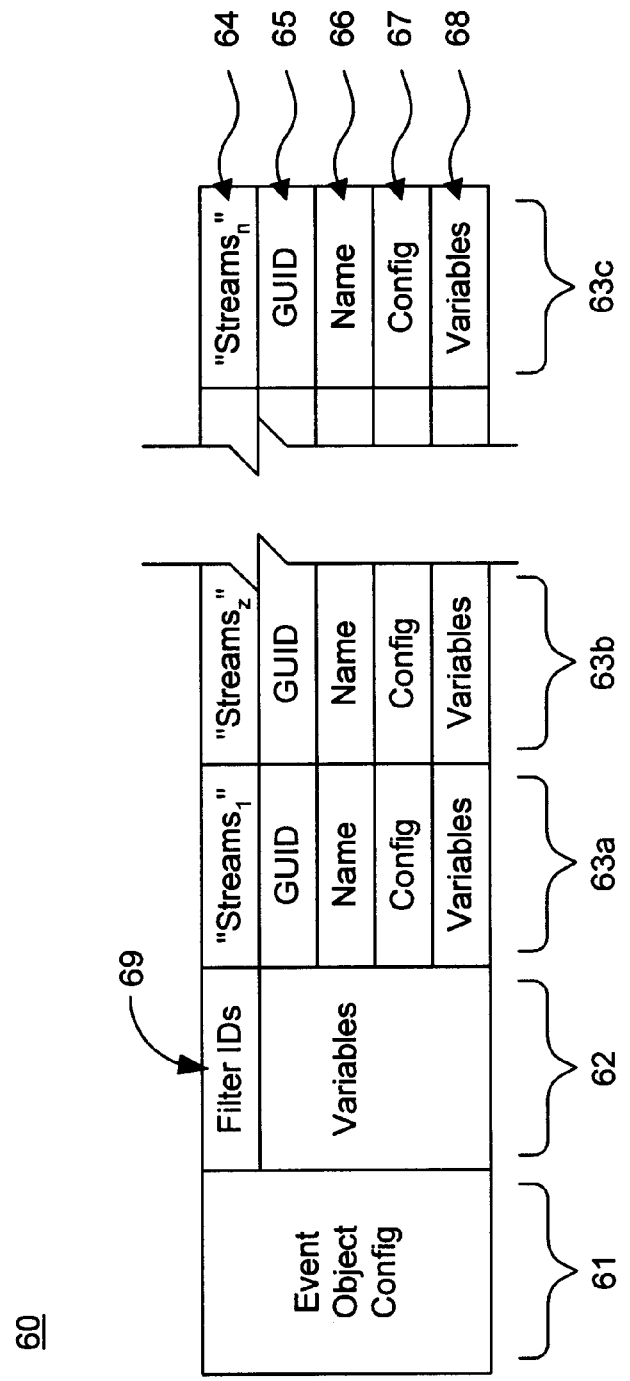
FIG. 4 is a data structure showing a binary large object (BLOB) for an action set for use in the manager of the system of FIG. 1.

FIG. 4 is a data structure showing a binary large object (BLOB) 60 storing an action set 32 for use in the manager 25 of the system of FIG. 1. Using the BLOB 60, an action set 32 can embed one or more actions 32 and can reference one or more event filters 40. An action set 32 forms an association with one or more network events 7 through scope, as the event mappings are stored in the database 26, including certogram mappings 48 and SNMP mappings 49, within an instance of an action set 32. Internally, each action set 32 stores the action set configuration 61, including any variables used by the action set 62, and one or more streams 63a–c within which are stored the specifications for actions 32. Each stream 63a contains a stream identifier 64, Globally Unique Identifier (GUID) 65, name 66, configuration 67, and any variables 68 used by the action. Also, if used, any filter identifiers 69 are also stored in the BLOB 60.

Figure 5:
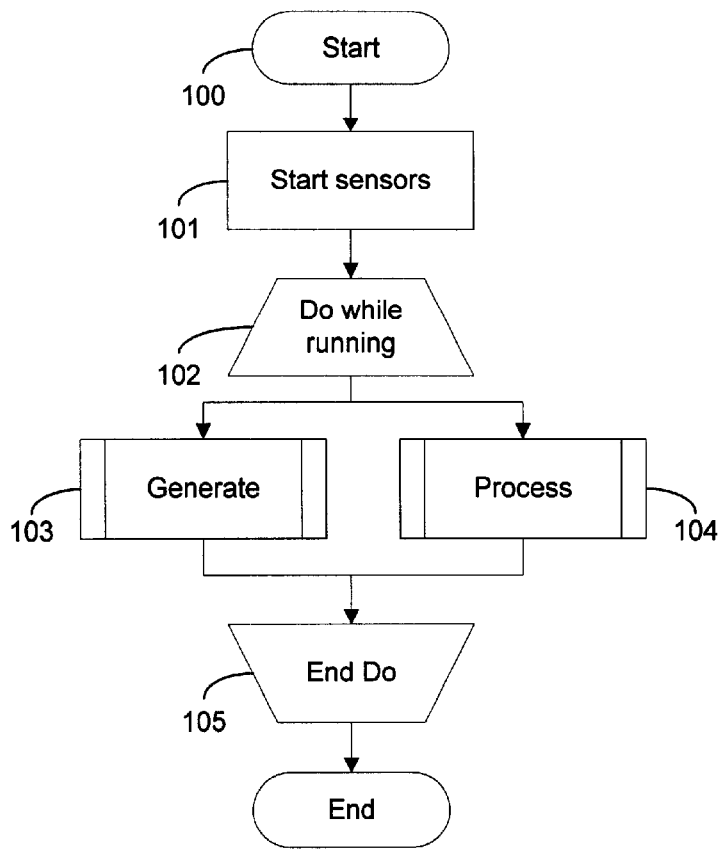
FIG. 5 is a flow diagram showing a method for dynamically processing network events using action sets in a distributed computing environment in accordance with the present invention.

FIG. 5 is a flow diagram showing a method 100 for dynamically processing network events 7 using action sets 32 in a distributed computing environment in accordance with the present invention. The method consists primarily of an initialization phase (block 101) and two sets of concurrently running routines, generate and process (blocks 103, 104, respectively). First, the sensors are started (block 101), including certogram sensor 45 and SNMP sensor 46 (shown in FIG. 3), as well as any other sensors being used with the system 100. Next, a continuous processing loop (blocks 102–105) is executed to concurrently run the generate (block 103) and process (block 104) sets of routines. Each of these routines include an independent thread of execution which launches a daemon process whenever work needs to be performed. The generate routine sets, as further described below with reference to FIG. 6, generates actions in response to network events 7 received from the sensors. The process routine sets, as further described below with reference to FIG. 10, executes the action sets generated by the generate daemon process. Execution of each processing thread (blocks 102–105) continues until the system 100 is shutdown, whereupon the method ends.

Figure 6:
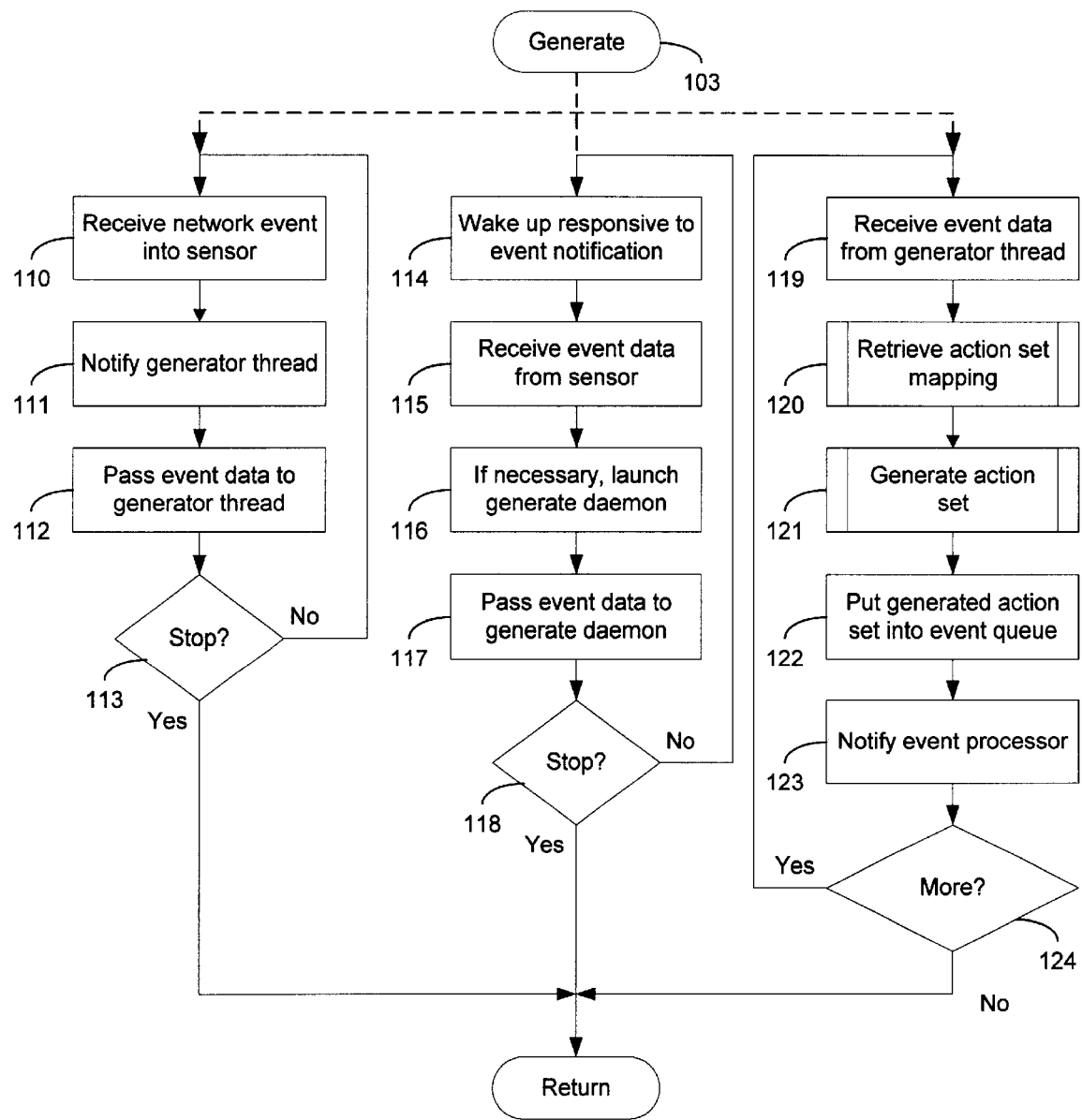
FIG. 6 is a block diagram showing the generate set of routines for use in the method of FIG. 5.

FIG. 6 is a block diagram showing the generate set of routines 103 for use in the method of FIG. 5. The purpose of this routine is generate action sets 32. There are three sets of related routines which can be grouped as follows. The receive thread (blocks 110–113) handles receiving network events. The generator thread (blocks 114–118) launches the generate daemon as necessary. The generate daemon (blocks 119–124) generates events. These routines preferably execute concurrently, thereby enabling each phase of the event lifecycle to run at full throttle without blocking another part of the event generation process.

The receive thread (blocks 110–113) with the receipt of a network event 7, including a certogram 30 or an SNMP trap 31, into a corresponding sensor, respectively certogram sensor 45 and SNMP sensor 46 (block 110). As a separate thread, the sensor can receive network events 7 as fast as the network events 7 arrive. In the described embodiment, the certogram 30 is communicated over an authenticated communications link. The generator thread (blocks 114–118) is notified by the sensor (block 111) to begin the action set generation process for this network event 7. Any event data received by the sensor along with the network event notification is passed to the generator thread (block 112). The receive thread continues receiving network events 7 until instructed to stop (block 113), whereupon the routine returns.

The generator thread (blocks 114–118) wakes up responsive to the event notification (block 114) sent by the receive thread (blocks 110–113). The event data is received from the sensor (block 115). If necessary, the generate daemon (blocks 119–124) is launched (block 116) and any event data is passed along (block 117). The generator thread (blocks 114–118) continues until instructed to stop (block 118), whereupon the routine returns.

Finally, the generate daemon (blocks 119–124) generates at least one action set beginning with the receipt of event data (block 119) as communicated by the generator thread (blocks 119–124) based on its event mapping. As described above, the storage manager 47 houses the database 26 and handles all database access requests. The sensor requests the retrieval of an action set mapping corresponding to the network event 7 from the action set mappings 43 (block 120), as further described below with reference to FIG. 7. The retrieved action set is then used to generate an action set (block 121), as further described below with reference to FIG. 8. The generated action set 56 is placed in the event queue 50 (shown in FIG. 3) (block 122) and the event processor, as implemented through the process set of routines, is notified (block 123). The generate daemon continues to generate events so long as more event data is being received (block 121), after which the routine returns.

Figure 7:
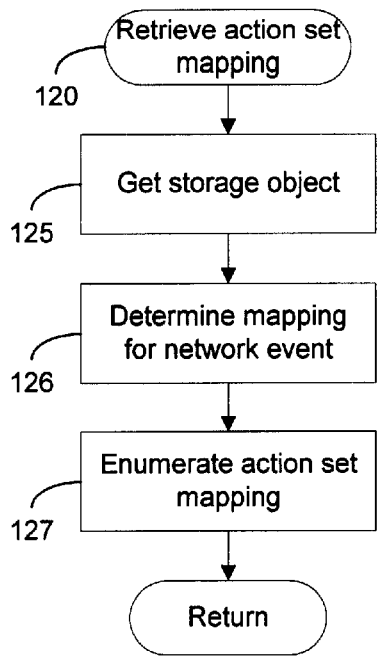
FIG. 7 is a block diagram showing the routine for retrieving an action set mapping for use in the routine of FIG. 6.

FIG. 7 is a block diagram showing the routine for retrieving an action set mapping 119 for use in the routine of FIG. 6. The purpose of this routine is to look up the action set 32 corresponding to the particular network event 7 received by a specific sensor. As described above, the mapping for each individual action set is referenced by a mapping key. For instance, the action sets 39 for the SNMP sensor 46 are referenced using a three-part identifier consisting of an OID plus Generic and Specific identifier. Recall that the definition for any Specific identifier must be obtained from the MIB supplied with the network device. The OID, Generic, and Specific identifier grouping is received as part of a UDP datagram storing an SNMP trap 31 which was received from the SNMP agent 24 (shown in FIG. 1). This information is used by the sensor to get the SNMP mappings 49 from the appropriate storage object (blocks 125 and 126). Similarly, the sensor and vulnerability is used by the sensor to get certogram mappings 48. The action set mapping is then enumerated to identify the individual event filters and actions which make up the action set (block 127), after which the routine returns.

Figure 8:
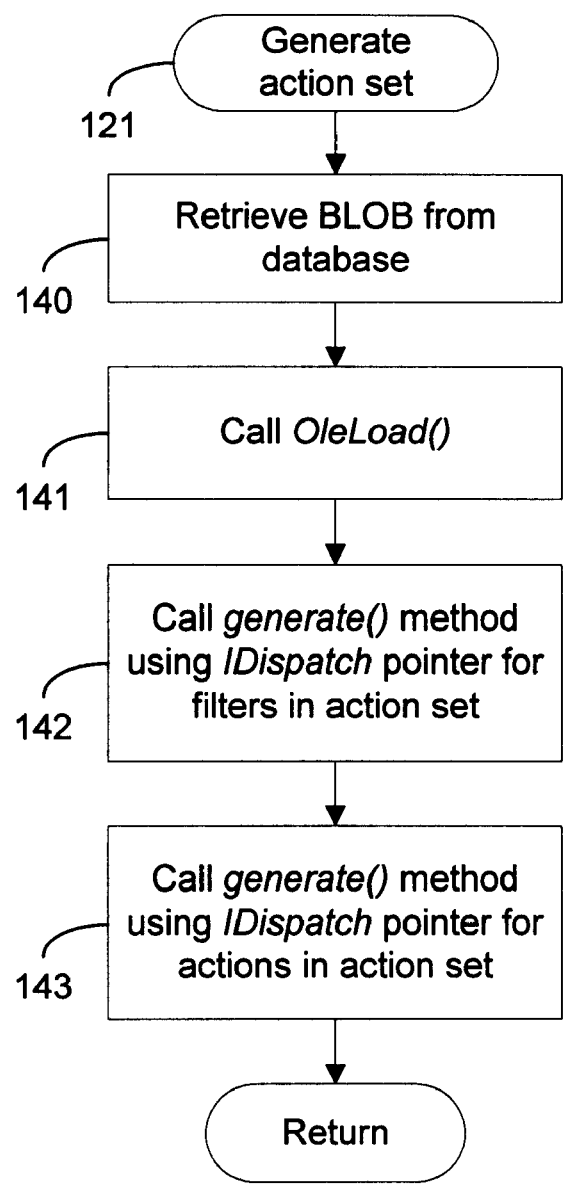
FIG. 8 is a block diagram showing the routine for generating an event for use in the routine of FIG. 6.

FIG. 8 is a block diagram showing the routine for generating an action set 120 for use in the routine of FIG. 6. The purpose of this routine is to create an instance of an action set. Using the action set mapping previously retrieved by the storage manager 47, the BLOB for the action set 32 is retrieved from the actions sets 51 (within the database 26) by the storage manager 47 (block 140). Upon receipt of the BLOB, a call is made to an OleLoad( ) method (block 141) from which an IDispatch pointer is received. Each action set can contain one or more actions and one or more optional event filters. The generate( ) method is called using the IDispatch pointer previously received when the action set was instantiated for each event filter (block 142) and action (block 143) in the action set 39. The generation of an event results in at least one generated action set being placed into the event queue 50 according to the severity of the action set and length of the event queue 50. In the described embodiment, the manager is notified of the occurrence of events by the sensors through the generation of an event rather than having to rely on the polling of individual sensors. The routine then returns.

Figure 9:
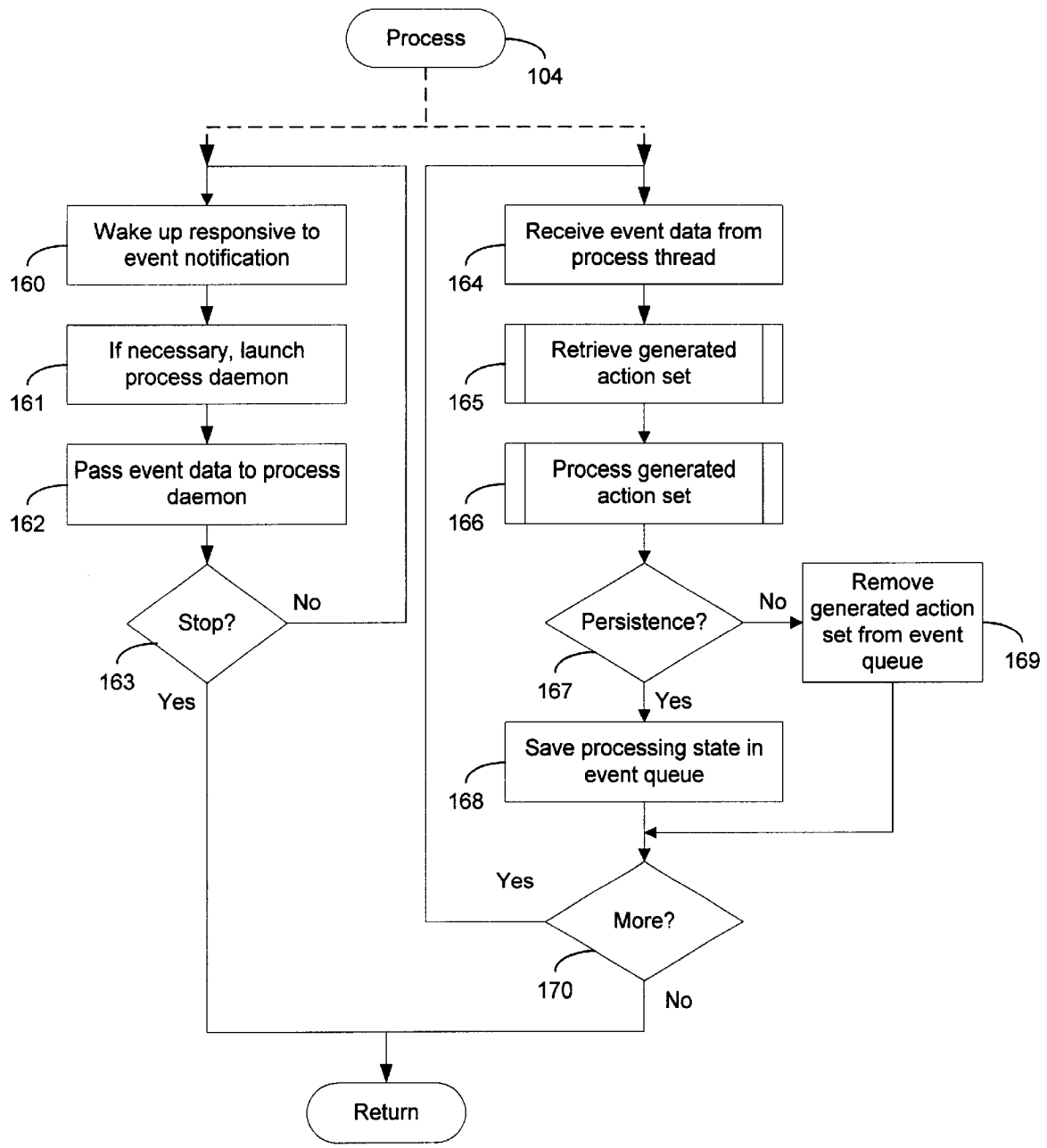
FIG. 9 is a block diagram showing the process set of routines for use in the method of FIG. 5.

FIG. 9 is a block diagram showing the process set of routines 104 for use in the method of FIG. 5. The purpose of this routine is to execute each action set placed on the event queue 50 by the generate daemon process. There are two sets of related routines which can be grouped as follows. The process thread (blocks 160–163) launches the process daemon as necessary. The process daemon (blocks 164–170) processes generated action sets. These routines preferably execute concurrently, thereby enabling each phase of the event lifecycle to run at full throttle without blocking another part of the event processing process.

The process thread (blocks 160–163) wakes up in response to the event notification (block 160) from the generate daemon (blocks 119–124 shown in FIG. 6). If necessary, the process daemon (blocks 164–170) is launched (block 161) and any event data is passed along (block 162). The process thread (blocks 160–163) continues until instructed to stop (block 163), whereupon the routine returns.

Finally, the process daemon (blocks 164–170) processes generated action sets 56 beginning with the receipt of event data (block 164) as communicated by the process thread (blocks 160–163). The next generated action set in the event queue 50 is retrieved (block 165) and processed (block 166), as further described below with reference to FIGS. 10 and 11, respectively. Upon the completion of processing, if the generated action set has persistent storage (block 167), the processing state of the generated action set is saved into the event queue 50 (block 168). Otherwise, the generated action set is retrieved from the event queue 50 (block 169). The routine is repeated so long as more generated action sets need processing (block 170), after which the routine returns.

Figure 10:
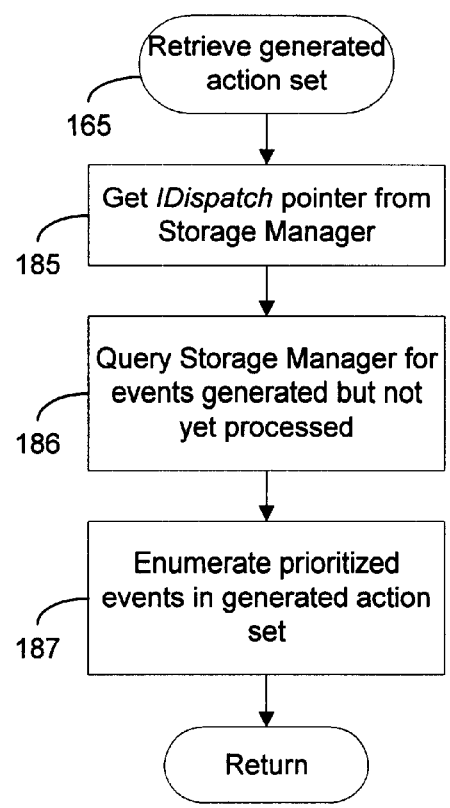
FIG. 10 is a block diagram showing the routine for retrieving a generated action set for use in the routine of FIG. 9.

FIG. 10 is a block diagram showing the routine for retrieving a generated action set 56 for use in the routine of FIG. 9. The purpose of this routine is to retrieve a generated action set from the event queue 50. The IDispatch pointer for the generated action set on the "top" of the event queue 50 is retrieved using the storage manager 47 (block 185). The set of generated action sets awaiting processing in the event queue 50 are placed in order of severity and the generated action set at the logical "top" of the event queue 50 may not actually be next in order of processing. Thus, the storage manager 44 must be queried to determine which generated action set 56 is to next be retrieved from the event queue 50 (block 186). The unprocessed prioritized events in the action set are then enumerated (block 187), after which the routine returns.

Figure 11:
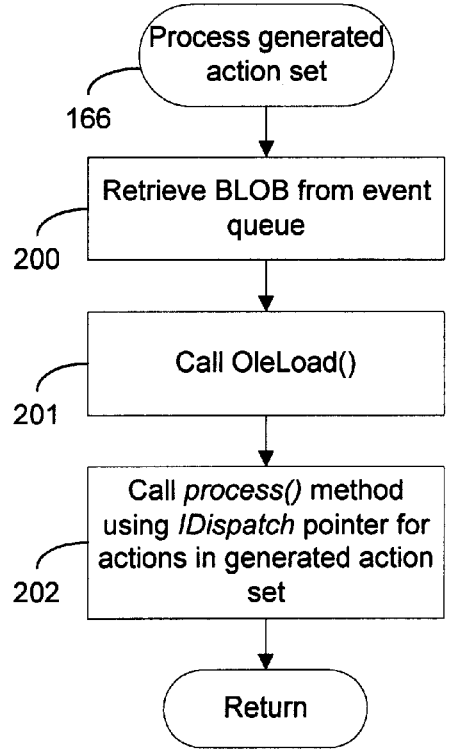
FIG. 11 is a block diagram showing the routine for processing a generated action set for use in the routine of FIG. 9.

FIG. 11 is a block diagram showing the routine for processing a generated action set 165 for use in the routine of FIG. 9. The purpose of this routine is to call the process( ) method for each of the generated action sets in the event queue 50. The generated action set previously identified by the storage manager 47 to next be processed is retrieved from the event queue 50 (within the database 26) by the storage manager 47 (block 200). Upon receipt of the generated action set 56, a call is made to an OleLoad( ) method (block 201) from which an IDispatch pointer is received. The generated action set previously identified by the storage manager 47 to next be processed is retrieved from the event queue 50 (block 200). The process( ) method is called using the IDispatch pointer previously received for each action and event filter in the generated action set 56 (block 202), after which the routine returns.

While the invention has been particularly shown and described as referenced to the embodiments thereof, those skilled in the art will understand that the foregoing and other changes in form and detail may be made therein without departing from the spirit and scope of the invention.

What is claimed is:

1. A system for dynamically processing a network event using an action set in a distributed computing environment, comprising:
    an event queue within which can be queued a plurality of generated action sets which each correspond to an instance of an action set;
    a manager comprising:
        a sensor comprising:
            a sensor thread sensing the occurrence of a network event through receipt of a message indicating a network event occurrence, the message including event data pertinent to the network event;
            a generate thread launching a generate daemon responsive to a notification from the sensor process;
            the generate daemon retrieving an event mapping corresponding to the network event and which identifies an action set, the generate daemon further generating a generated action set from the event mapping and enqueueing the generated action set onto the event queue; and
        a process thread launching a process daemon responsive to a notification from the generate daemon; and
        the process daemon removing the generated action set from the event queue and processing the generated action set by causing the execution of at least one action embedded therein.

2. A system according to claim 1, wherein each sensor shares a common interface which can be invoked by at least one of a client process and another sensor.

3. A system according to claim 1, wherein the common interface is COM-compliant.

4. A system according to claim 1, further comprising:
    at least one agent sensing the occurrence of the network event; and
    the sensor thread receiving the network event occurrence message from the at least one agent.

5. A system according to claim 4, wherein the at least one agent is an authenticated sensor, further comprising
    a secure connection between the authenticated sensor and the manager; and
    the corresponding sensor receiving the message over the secure connection upon authentication of the sensor and the manager.

6. A system according to claim 5, wherein the secure connection is effected via a Transport Layer Security connection.

7. A system according to claim 1, further comprising:
    a storage manager maintaining the event mapping within a database.

8. A system according to claim 7, further comprising:
    the storage manager further maintaining the action set as a binary large object (BLOB) within the database.

9. A system according to claim 1, wherein the action set comprises an association with at least one network event.

10. A system according to claim 9, wherein the network event comprises one at least one of an SNMP trap and a certogram.

11. A system according to claim 1, wherein the action set comprises at least one event filter, the process daemon processing the at least one event filter prior to the execution of the at least one action.

12. A system according to claim 11, wherein the event filter comprises at least one of an executable script, frequency threshold, and adding custom values to the event data.

13. A system according to claim 1, wherein the embedded action comprises at least one of notifying a help desk, notifying a firewall, broadcasting a network message, sending an electronic mail message, sending an alphanumeric page, and running a script.

14. A method for dynamically processing a network event using an action set in a distributed computing environment, comprising:
    sensing the occurrence of a network event via a sensor thread through receipt of a message indicating a network event occurrence, the message including event data pertinent to the network event;
    launching a generate daemon via a generate thread responsive to a notification from the sensor process;
    retrieving an event mapping by the generate daemon, the event mapping corresponding to the network event and identifying an action set;
    generating a generated action set from the event mapping by the generate daemon and enqueueing the generated action set onto an event queue within which can be queued a plurality of generated action sets which each correspond to an instance of an action set;
    launching a process daemon via a process thread responsive to a notification from the generate daemon; and
    removing the generated action set from the event queue by the process daemon and processing the generated action set by causing the execution of at least one action embedded therein.

15. A method according to claim 14, wherein each sensor shares a common interface which can be invoked by at least one of a client process and another sensor.

16. A method according to claim 14, wherein the common interface is COM-compliant.

17. A method according to claim 14, further comprising:
    sensing the occurrence of the network event on the at least one agent; and
    receiving the network event occurrence message via the sensor thread from the at least one agent.

18. A method according to claim 17, wherein is an authenticated sensor, further comprising
    forming a secure connection between the at least one agent and the sensor; and
    receiving the message over the secure connection upon authentication of the at least one agent and the sensor.

19. A method according to claim 18, wherein the secure connection is effected via a Transport Layer Security connection.

20. A method according to claim 14, further comprising:
    maintaining the event mapping within a database using a storage manager.

21. A method according to claim 20, further comprising:
    maintaining the action set as a binary large object (BLOB) within the database.

22. A method according to claim 14, wherein the action set comprises an association with at least one network event.

23. A method according to claim 22, wherein the network event comprises one at least one of an SNMP trap and a certogram.

24. A method according to claim 14, wherein the action set comprises at least one event filter, the process daemon processing the at least one event filter prior to the execution of the at least one action.

25. A method according to claim 24, wherein the event filter comprises at least one of an executable script, frequency threshold, and adding custom values to the event data.

26. A method according to claim 14, wherein the embedded action comprises at least one of notifying a help desk, notifying a firewall, broadcasting a network message, sending an electronic mail message, sending an alphanumeric page, and running a script.

27. A computer-readable storage medium holding code for dynamically processing a network event using an action set in a distributed computing environment, comprising:

sensing the occurrence of a network event via a sensor thread through receipt of a message indicating a network event occurrence, the message including event data pertinent to the network event;

launching a generate daemon via a generate thread responsive to a notification from the sensor process;

retrieving an event mapping by the generate daemon, the event mapping corresponding to the network event and identifying an action set;

generating a generated action set from the event mapping by the generate daemon and enqueueing the generated action set onto an event queue within which can be queued a plurality of generated action sets which each correspond to an instance of an action set;

launching a process daemon via a process thread responsive to a notification from the generate daemon; and removing the generated action set from the event queue by the process daemon and processing the generated action set by causing the execution of at least one action embedded therein.

28. A storage medium according to claim 27, wherein each sensor shares a common interface which can be invoked by at least one of a client process and another sensor.

29. A storage medium according to claim 27, wherein the common interface is COM-compliant.

30. A storage medium according to claim 27, further comprising:

sensing the occurrence of the network event on the at least one agent; and receiving the network event occurrence message via the sensor thread from the at least one agent.

31. A storage medium according to claim 30, wherein is an authenticated sensor, further comprising forming a secure connection between the at least one agent and the sensor; and receiving the message over the secure connection upon authentication of the at least one agent and the sensor.

32. A storage medium according to claim 31, further comprising:

maintaining the event mapping within a database using a storage manager.

33. A storage medium according to claim 32, further comprising:

maintaining the action set as a binary large object (BLOB) within the database.

* * * * *

UNITED STATES PATENT AND TRADEMARK OFFICE
CERTIFICATE OF CORRECTION

PATENT NO. : 6,654,782 B1
DATED : November 25, 2003
INVENTOR(S) : O'Brien et al.

Page 1 of 1

It is certified that error appears in the above-identified patent and that said Letters Patent is hereby corrected as shown below:

<u>Title page,</u>
Item [62], "Christopher J. Hamat" should read -- Christopher J. Hamaty --

Signed and Sealed this

Thirteenth Day of April, 2004

JON W. DUDAS
*Acting Director of the United States Patent and Trademark Office*